United States Patent
Li et al.

(10) Patent No.: US 9,800,164 B1
(45) Date of Patent: Oct. 24, 2017

(54) COMPENSATION CIRCUIT FOR CONSTANT OUTPUT VOLTAGE

(71) Applicant: Suzhou Poweron IC Design Co., Ltd, Jiangsu Province, P.R. (CN)

(72) Inventors: Haisong Li, Jiangsu (CN); Changshen Zhao, Jiangsu (CN); Yangbo Yi, Jiangsu (CN); Wenliang Liu, Jiangsu (CN)

(73) Assignee: SUZHOU POWERON IC DESIGN CO., LTD, Jiangsu Province, Suzhou (CN)

( * ) Notice: Subject to any disclaimer, the term of this patent is extended or adjusted under 35 U.S.C. 154(b) by 0 days.

(21) Appl. No.: 15/353,569

(22) Filed: Nov. 16, 2016

(30) Foreign Application Priority Data

Jul. 20, 2016 (CN) .......................... 2016 1 0571170

(51) Int. Cl.
*H02M 3/335* (2006.01)
*H02M 1/36* (2007.01)
*H02M 1/08* (2006.01)
*H02M 1/00* (2006.01)

(52) U.S. Cl.
CPC ......... *H02M 3/33515* (2013.01); *H02M 1/08* (2013.01); *H02M 1/36* (2013.01); *H02M 2001/0009* (2013.01)

(58) Field of Classification Search
CPC .... H02M 3/28; H02M 3/335; H02M 3/33507; H02M 3/33523; H02M 3/33561; H02M 3/33569; H02M 3/33592; H02M 1/36; H02M 2001/0032; Y02B 70/1441; Y02B 70/1443; Y02B 70/1475

USPC .................................................. 363/15–21.18
See application file for complete search history.

(56) References Cited

U.S. PATENT DOCUMENTS

| | | | | |
|---|---|---|---|---|
| 3,295,111 | A * | 12/1966 | Ault ....................... | G11C 17/02 365/97 |
| 6,721,192 | B1 * | 4/2004 | Yang ................... | H02M 3/33507 363/21.11 |
| 7,099,163 | B1 * | 8/2006 | Ying ................... | H02M 3/33523 363/21.11 |
| 7,307,390 | B2 * | 12/2007 | Huynh .............. | H02M 3/33507 315/209 R |
| 8,472,214 | B2 * | 6/2013 | Huang .............. | H02M 3/33523 363/21.12 |
| 2013/0114308 | A1 * | 5/2013 | Liao ................... | H02M 3/33507 363/21.01 |

* cited by examiner

*Primary Examiner* — Yemane Mehari
(74) *Attorney, Agent, or Firm* — Munck Wilson Mandala LLP (57) ABSTRACT

A compensation circuit for constant output voltage is disclosed. The compensation circuit comprises a current source, a first switch, a controllable current source, a second switch, a logic NOT gate, a CV loop control module, and an input voltage detection module. The compensation circuit ensures a normal start-up, and substantially no additional power dissipation of the converter is generated at no load. Furthermore, the compensation circuit adjusts a compensation current according to at least one of a detected input voltage of the power supply converter and a working mode of the transformer, to obtain better precision of constant output voltage. The compensation circuit can be applied to occasions where extremely small standby input power dissipation or extremely high precision of constant output voltage is required.

14 Claims, 7 Drawing Sheets

COMPENSATION CIRCUIT FOR CONSTANT OUTPUT VOLTAGE

CROSS-REFERENCE TO RELATED APPLICATIONS

This application claims priority to and/or benefit of Chinese Patent Application No. 201610571170.4, filed on Jul. 20, 2016, entitled COMPENSATION CIRCUIT FOR CONSTANT OUTPUT VOLTAGE, which is incorporated by reference herein in its entirety.

TECHNICAL FIELD

The present disclosure relates to a compensation circuit for constant output voltage, which is applicable to a power management integrated circuit, and belongs to the technical field of power semiconductors.

BACKGROUND

Figure 1:
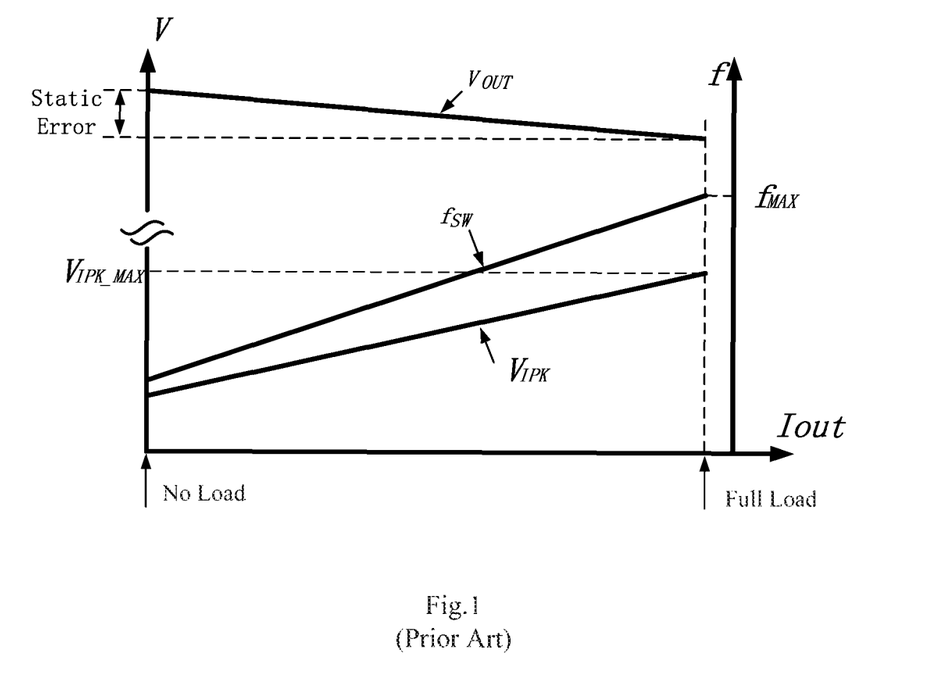
FIG. 1 is a schematic diagram illustrating the relationship between the static error and the output current in a PSR constant voltage control circuit in the prior art.

In a control chip of a PSR (Primary-Side Regulation) flyback power supply, the output voltage is commonly regulated through regulation modes with static error, such as PWM (Pulse Width Modulation), PFM (Pulse Frequency Modulation). In a constant voltage loop, the amplified error value between the output voltage and the reference voltage is adopted to represent the magnitude of the output load (power), and is taken as the loop control voltage to regulate the input power, and to ensure the output voltage to be constant within a certain accuracy range. The amplified error value $V_{EA}$ can be represented by the formula $V_{EA}=V_{REF}+A_V(V_{REF}-V_{FB})$, wherein, $V_{REF}$ is a reference voltage; $A_V$ is a gain of the error amplifier; $V_{FB}$ is a sampling value of the output voltage. The relationship between $V_{FB}$ and the output voltage is that: $V_{FB}=K_{SMP} \times V_{OUT}$, wherein, $K_{SMP}$ is a sampling ratio. On the other hand, when the transformer operates in DCM (Discontinuous Current Mode), the relationship between the input power and the output power of the power converter is that:

$$\frac{1}{2}L_m \times \left(\frac{V_{IPK}}{R_{CS}}\right)^2 \times f_{sw} \times \eta = V_{OUT} \times I_{OUT},$$

wherein, $L_M$ is the inductance of the primary side of the transformer; $R_{CS}$ is the resistance of the current detection resistor of the primary side of the transformer; $V_{IPK}$ is the voltage peak of the resistor $R_{CS}$; $f_{SW}$ is the switching frequency of the power transistor of the primary side of the transformer; $\eta$ is the conversion efficiency of the power supply. In addition, the relationship between the $V_{IPK}$ and $V_{EA}$ in PWM is that: $V_{IPK}=K_{IPK} \times V_{EA}$, while the relationship between the $f_{SW}$ and $V_{EA}$ in PFM is that: $f_{SW}=f_{MAX}-\Delta f \times (V_{EA|MAX}-V_{EA})$, wherein, $f_{MAX}$ and $V_{EA|MAX}$ are respectively the highest frequency of the constant voltage control and the amplified error value corresponding to the highest frequency. The relationship between the static error (the difference between the output voltage and the preset reference voltage) and the output current is shown in FIG. 1. Along with the increase of the output current $I_{OUT}$ (namely, the increase of the load), $V_{IPK}$ or $f_{SW}$ increases, namely, $V_{EA}$ increases, that is, the static error increases.

Figure 2:
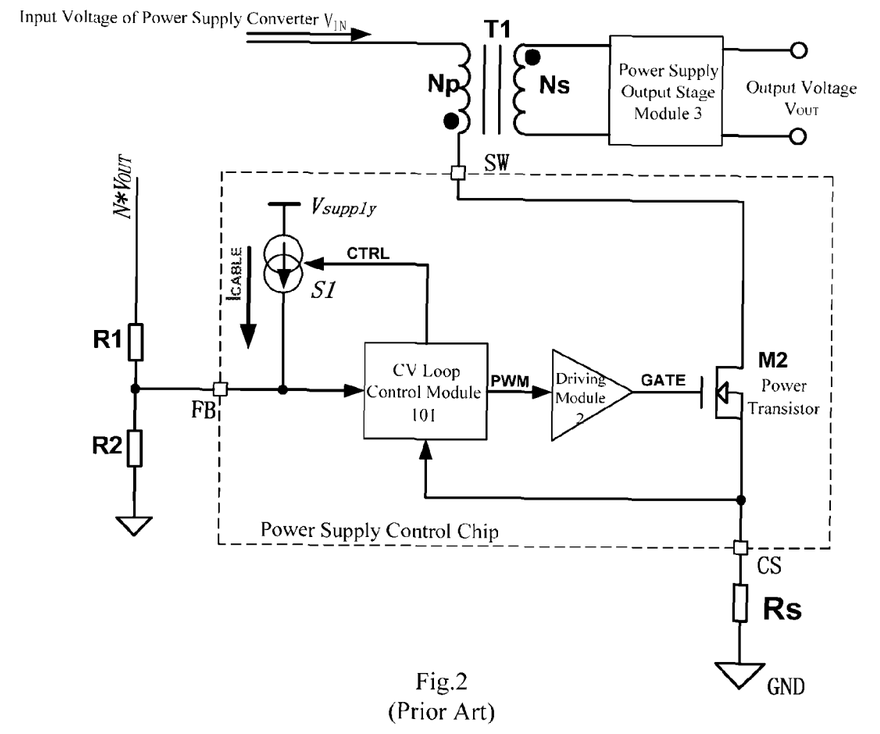
FIG. 2 is a block diagram illustrating the structure of the power control circuit with constant output voltage compensation in the prior art.

FIG. 2 is a block diagram illustrating the structure of the power control circuit with constant output voltage compensation in the prior art. The control structure includes a resistor R1, a resistor R2, a CV loop control module 101, a controllable current source S1, a driving module 2, a power transistor M1, and a resistor Rs. The connection relationship between the elements is as follows: a first end of the resistor R1 is connected to the primary-side feedback source $N*V_{OUT}$ of the output voltage; a second end of the resistor R1 and a first end of the resistor R2 are connected to the pin FB of the control chip of the power supply and are further connected to a first input end of the CV loop control module 101 and an output end of the controllable current source S1; a second end of the resistor $R_2$ is connected to the power supply ground; a first output end of the CV loop control module 101 is connected to a control end of the controllable current source S1; an input end of the controllable current source S1 is connected to the power supply signal terminal $V_{supply}$ of the chip; a second output end of the CV loop control module 101 is connected to the input end of the driving module 2; an output end of the driving module 2 is connected to the grid of the power transistor M1; a drain of the power transistor M1 is connected to a pin SW of the chip; the source of the power transistor M1 is connected to a first end of the resistor Rs and further connected to the pin CS of the chip; a second end of the resistor Rs is connected to the power supply ground. The working principle is as follows: the CV loop control module 101 detects the magnitude of the output load, and controls the current of the controllable current source S1 based on the magnitude of the detected output load. Further, one flow of current $I_{CABLE}$, which has a negative correlation with the output load, flows out of the chip from the pin FB. The feedback voltage is represented as $$V_{FB} = N * V_{OUT} * \frac{R_2}{R_1 + R_2}.$$

As the current $I_{CABLE}$ flows through the resistor $R_2$, the voltage $V_{FB}$ increases by $I_{CABLE}*R_2$, which makes the voltage $V_{EA}$ reduce by $I_{CABLE}*R_2*A_V$, and the output voltage $V_{OUT}$ of the power supply output stage module 3 reduces as well. Along with the decrease of the output current $I_{OUT}$ (namely the decrease of the load), the voltage $V_{EA}$ decreases, and the current $I_{CABLE}$ increases gradually. For larger current $I_{CABLE}$, the voltage $V_{FB}$ increases more, and the voltage $V_{OUT}$ reduces much more than that without compensation. With reference to the relationship between the static error of the output voltage and the output load shown in FIG. 1, it can be seen that the precision of the constant output voltage is improved.

Figure 3A:
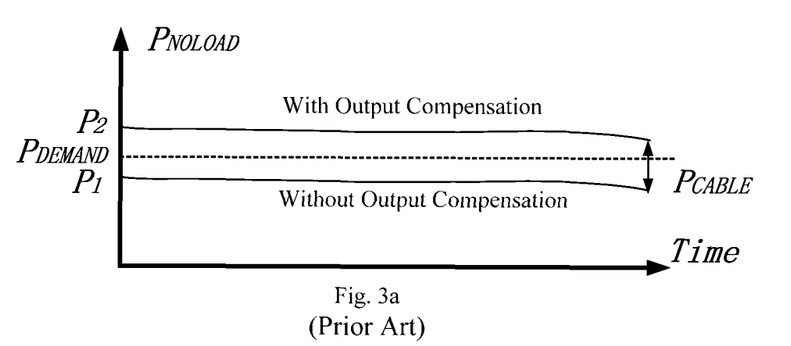
FIGS. 3(a) and 3(b) illustrate a group of example waveforms of the compensation circuit for constant output voltage in the prior art.
Figure 3B:
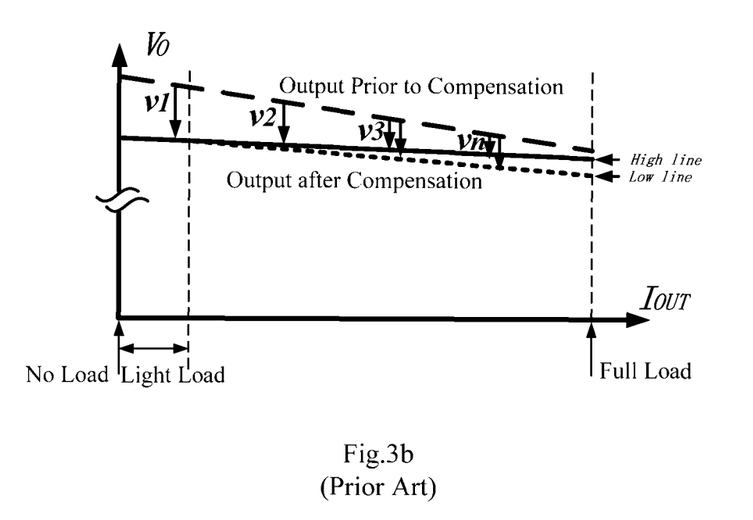

FIGS. 3(a) and 3(b) illustrate waves corresponding to the compensation method for constant output voltage in the prior art. As shown in FIG. 3b), the load increases from zero load to full load, and the output voltage without compensation decreases from a higher value to a lower value. As can be seen from FIG. 2, the compensation current $I_{CABLE}$ increases along with the reduction of the load. In the interval of light load or even no load, a larger current flows from the power supplying module, which increases the standby power dissipation of the power supply system. As shown in FIG. 3a), $P_1$ represents the standby power dissipation when no output compensation is applied; $P_2$ represents the standby power dissipation when output compensation is applied; $P_{CABLE}$ is the increased value. As the compensation current is larger, $P_{CABLE}$ is larger, as a result the standby power dissipation is likely to be larger than the required value $P_{DEMAND}$. What's more, in order to achieve better properties of power supply, such as higher efficiency and better utilization of the transformer, a control policy relevant to the input voltage is introduced in the CV control loop, which makes the modulation gain of the CV loop (the correspondence between the detected output load and the actual output load of the CV loop) differs between conditions of high input voltages and conditions of low input voltages. When the same profile of the compensation current $I_{CABLE}$ is applied, different output voltage compensation effects are attained. As shown in the figure, there are remarkable differences between the output voltage curve High line (solid) and the output voltage curve Low line (dotted), which influences the precision of the output voltage. The above situations influence the properties of the power supply converter from different aspects. As it is desirable to avoid the above situations through design of the circuit, the traditional compensation methods for constant output voltage should be adjusted.

SUMMARY

The present disclosure aims at overcoming the defects in the prior art, and providing a compensation circuit for constant output voltage.

The objectives of the present disclosure are achieved by the following technical schemes:

A compensation circuit for constant output voltage is characterized in that it comprises a current source, a first switch, a controllable current source, a second switch, a logic NOT gate, a CV loop control module, and an input voltage detection module; an input end of the current source is connected to a power supply signal terminal $V_{supply}$ in a power supply control chip; an output end of the current source is connected to a first end of the first switch; a second end of the first switch is connected to a first input end of the CV loop control module, a first end of the second switch, and a pin FB of the power supply control chip; a control end of the first switch is connected to an input end of the logic NOT gate and a signal terminal $T_{start}$; a second end of the second switch is connected to an input end of the controllable current source; a control end of the second switch is connected to an output end of the logic NOT gate; a first control end of the controllable current source is connected to a first output end of the CV loop control module; a second control end of the controllable current source is connected to an output end of the input voltage detection module; an output end of the controllable current source is connected to the power supply ground; a second input end of the CV loop control module is connected to a pin CS of the power supply control chip; a second output end of the CV loop control module is connected to an input end of the driving module; and an input end of the input voltage detection module is connected to a pin SW of the power supply control chip.

Further, in the compensation circuit for constant output voltage, the pin SW is connected to a drain of a power transistor; the pin FB is connected to a first end of a first resistor and a first end of a second resistor; the pin CS is connected to a source of the power transistor and a first end of a resistor Rs; an output end of the driving module is connected to a grid of the power transistor; a second end of the first resistor is connected to a source $N*V_{OUT}$ of a primary feedback side; a second end of the second resistor is connected to the power supply ground; and a second end of the resistor Rs is connected to the power supply ground.

Further, in the compensation circuit for constant output voltage, when a signal at the signal terminal $T_{start}$ is a high level, namely, at a soft-starting stage, a compensation current $I_{CABLE}$ supplied by the current source flows out of the chip from the pin FB and flows through a second resistor; when the signal at the signal terminal $T_{start}$ is a low level, namely, at a normal working stage after the soft start-up, the compensation current $I_{CABLE}$ supplied by the controllable current source flows through a first resistor and flows into the chip from the pin FB.

Further, in the compensation circuit for constant output voltage, the input voltage detection module includes a resistor $R_{HV}$, a current sampling module, a mirror proportional module, and a current comparator; a first end of the resistor $R_{HV}$ is connected to the pin SW; a second end of the resistor $R_{HV}$ is connected to an input end of the current sampling module; an output end of the current sampling module is connected to an input end of the mirror proportional module; an output end of the mirror proportional module is connected to a first input end of the current comparator; a second input end and a third input end of the current comparator are respectively connected to a first current reference terminal $I_{REF1}$ and a second current reference terminal $I_{REF2}$.

Further, in the compensation circuit for constant output voltage, the input voltage detection module is configured to detect an input voltage of a power supply converter, judge which range the input voltage falls within, and generate a control signal to regulate a compensation current $I_{CABLE}$ when the power supply converter works at normal stage.

Further, in the compensation circuit for constant output voltage, the input voltage detection module is configured to sample and process a current flowing into the input voltage detection module from the pin SW to get information of an input voltage of a power supply converter; and the input voltage is from an AC input end or a DC input end of the power supply converter.

Further, in the compensation circuit for constant output voltage, the CV loop control module includes a sampling and detecting module, an error amplifying module, a peak calculation module, a comparator, a leading edge blanking module, a frequency generating module, a RS latch, and an output compensation and control module; an input end of the sampling and detecting module is connected to the pin FB; an output end of the sampling and detecting module is connected to a first input end of the error amplifying module; a second input end of the error amplifying module is connected to a reference terminal $V_{REF}$; a first output end of the error amplifying module is connected to an input end of the frequency generating module and is connected to a first input end of the output compensation and control module; a second output end of the error amplifying module is connected to an input end of the peak calculation module; a first output end of the frequency generating module is connected to a second input end of the output compensation and control module; a second output end of the frequency generating module is connected to an input terminal S of the RS latch; an output end of the peak calculation module is connected to a negative input terminal of the comparator; a positive input terminal of the comparator is connected to an output end of the leading edge blanking module; an output end of the comparator is connected to an input terminal R of the RS latch; an input end of the leading edge blanking module is connected to the pin CS.

Further, in the compensation circuit for constant output voltage, the output compensation and control module is configured to regulate a compensation current $I_{CABLE}$ at normal working stage based on a control voltage (namely, the amplified error value) $V_{EA}$ generated by the error amplifying module and/or a switching frequency generated by the frequency generating module; and the current $I_{CABLE}$ is positively correlated with the control voltage $V_{EA}$ and/or the switching frequency.

Further, in the compensation circuit for constant output voltage, the CV loop control module is configured to detect magnitude of an output load of a power supply converter, generate a control signal based on the magnitude of the output load, and regulate the compensation current $I_{CABLE}$ at normal working stage.

Further, in the compensation circuit for constant output voltage, at a soft-starting stage of a power supply converter, namely, when the signal at the signal terminal $T_{start}$ is a high level, the current source is on, while the controllable current source is off, a compensation current flows out of the pin FB and flows through a second resistor to increase a feedback voltage $V_{FB}$ and ensure normal sampling and detecting with respect to feedback voltage $V_{FB}$ at an initial phase of the soft-starting stage, thereby enabling a normal start-up; after the soft-starting stage ends, namely, when the signal $T_{start}$ is inverted to be a logic low level, the current source is off, while the controllable current source is on, the compensation current flows into the chip from the pin FB, thereby reducing power dissipation at light load or even no load; meanwhile, the CV loop control module regulates the compensation current $I_{CABLE}$ based on a value of a control voltage $V_{EA}$, which represents an output load, and the compensation current is changed at different slopes in different load intervals so as to comply with the variations of the modulation gain of the constant voltage control loop; along with the increase of the load, namely, the increase of the output current $I_{OUT}$, the value of the control voltage $V_{EA}$ of the loop increases, and the compensation current $I_{CABLE}$ increases gradually; the feedback voltage $V_{FB}$ is represented as:

$$V_{FB} = N * V_{OUT} * \frac{R_2}{R_1 + R_2};$$

as an additional voltage drop is created when the current $I_{CABLE}$ flows through a first resistor, the feedback voltage $V_{FB}$ decreases, which makes the control voltage $V_{EA}$ increases, and the output voltage $V_{OUT}$ increases accordingly; along with an increase of an output current $I_{OUT}$, the control voltage $V_{EA}$ increases, and the current $I_{CABLE}$ increases gradually; for a larger current $I_{CABLE}$, the feedback voltage $V_{FB}$ decreases much more, and the output voltage $V_{OUT}$ increases much more than that without compensation; through changing the flow direction of the compensation current at normal working stage, the compensation current in the interval of light load or even no load is very small, thereby reducing the power dissipation at light load or even no load.

The substantive features and notable progresses of the present disclosure are as follows:

1. According to the compensation circuit for constant output voltage of the present disclosure, prior to the soft start-up completed, the compensation current $I_{CABLE}$ follows out of the chip from the pin FB, so as to ensure a normal start-up. After the soft start-up, the compensation current $I_{CABLE}$ follows into the chip from the pin FB, and the magnitude of the current decreases along with the increase of the load, and substantially no additional power dissipation of the converter is generated at light load or even no load, thereby ensuring the design requirements of low standby power dissipation for the power supply converter.

2. The input voltage of the power supply converter or the working mode of the transformer is detected, and the magnitude and the change slopes of the compensation current $I_{CABLE}$ are regulated according to at least one of the detected input voltage of the power supply converter and the working mode of the transformer, thereby compensating the differences of the modulation gain of the constant voltage control loop between conditions of high input voltages and conditions of low input voltages, so as to obtain better precision of constant output voltage.

3. The compensation circuit for constant output voltage of the present disclosure can not only meet the design requirements of low standby power dissipation for the power supply converter, but also increase the precision of constant output voltage. The compensation circuit can be applied to the occasions where extremely small standby input power dissipation or extremely high precision of constant output voltage is required.

DETAILED DESCRIPTION

Through designing a compensation circuit for constant output voltage, the standby power dissipation of the power supply can be reduced. What's more, through regulating the compensation current under conditions of high input voltages and conditions of low input voltages, the precision of the constant output voltage can be improved. The compensation circuit for constant output voltage can be applied to the occasions where extremely small standby input power dissipation or extremely high precision of constant output voltage is required.

Figure 4:
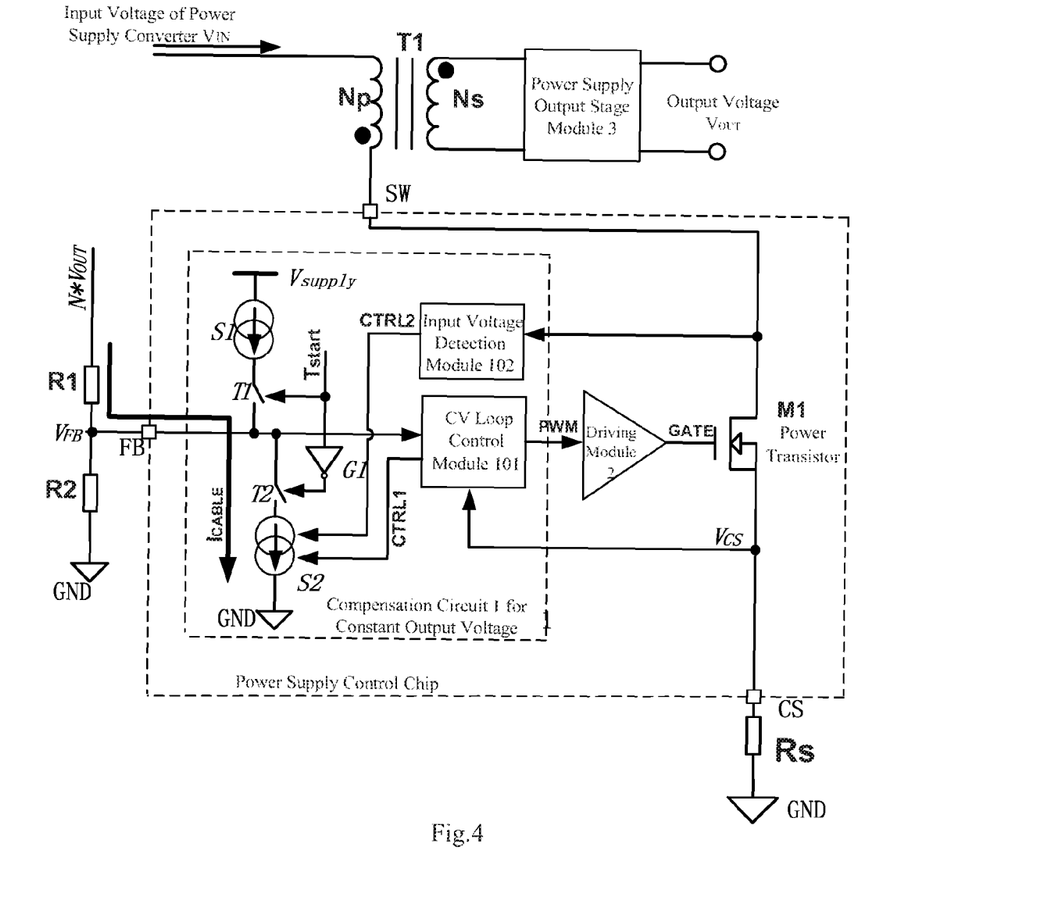
FIG. 4 is a schematic diagram illustrating the power supply converter with constant output voltage compensation according to the present disclosure.

As shown in FIG. 4, the compensation circuit 1 for constant output voltage includes a current source S1, a first switch T1, a controllable current source S2, a second switch T2, a logic NOT gate G1, a CV loop control module 101, and an input voltage detection module 102. An input end of the current source S1 is connected to the power supply signal terminal $V_{supply}$ in the power supply control chip; an output end of the current source S1 is connected to a first end of the first switch T1; a second end of the first switch T1 is connected to a first input end of the CV loop control module 101, a first end of the second switch T2, and a pin FB of the power supply control chip; a control end of the first switch T1 is connected to an input end of the logic NOT gate G1 and a signal terminal $T_{start}$; a second end of the second switch T2 is connected to an input end of the controllable current source S2; a control end of the second switch T2 is connected to an output end of the logic NOT gate G1; a first control end of the controllable current source S2 is connected to a first output end of the CV loop control module 101; a second control end of the controllable current source S2 is connected to an output end of the input voltage detection module 102; an output end of the controllable current source S2 is connected to the power supply ground; a second input end of the CV loop control module 101 is connected to a pin CS of the power supply control chip; a second output end of the CV loop control module 101 is connected to an input end of the driving module 2; an input end of the input voltage detection module 102 is connected to a pin SW of the power supply control chip.

Wherein, the pin SW is connected to the drain of the power transistor M1; the pin FB is connected to a first end of the first resistor R1 and a first end of the second resistor R2; the pin CS is connected to a source of the power transistor M1 and a first end of the resistor Rs; an output end of the driving module 2 is connected to a grid of the power transistor M1; a second end of the first resistor R1 is connected to the source $N*V_{OUT}$ of the primary feedback side; a second end of the second resistor R2 is connected to the power supply ground; a second end of the resistor Rs is connected to the power supply ground.

When the signal at the signal terminal $T_{start}$ is a high level, namely, at the soft-starting stage, the compensation current $I_{CABLE}$ supplied by the current source S1 flows out of the pin FB and flows through the second resistor R2. When the signal at the signal terminal $T_{start}$ is a low level, namely, at the normal working stage after soft start-up, the compensation current $I_{CABLE}$ supplied by the controllable current source S2 flows through the first resistor R1 and flows into the pin FB.

At the soft-starting stage of the power supply converter, namely, when the signal at the signal terminal $T_{start}$ is a high level, the current source S1 is on, while the controllable current source S2 is off; the compensation current flows out of the pin FB and flows through the second resistor R2, so as to increase the feedback voltage $V_{FB}$ and ensure normal sampling and the detecting with respect to feedback voltage $V_{FB}$ at the initial phase of the soft-starting stage, thereby enabling a normal start-up. After the soft-starting stage ends, the signal $T_{start}$ is inverted to be a logic low level; the current source S1 is off, while the controllable current source S2 is on; the compensation current flows into the chip from the pin FB, thereby reducing the power dissipation at light load or even no load. At the same time, the CV loop control module regulates the compensation current $I_{CABLE}$ based on a value of a control voltage $V_{EA}$, which represents an output load, and the compensation current is changed at different slopes in different load intervals so as to comply with the variations of the modulation gain of the constant voltage control loop. Along with the increase of the load, namely, the increase of the output current $I_{OUT}$, the control voltage $V_{EA}$ of the loop increases, and the compensation current $I_{CABLE}$ increases gradually. The feedback voltage $V_{FB}$ is represented as:

$$V_{FB} = N * V_{OUT} * \frac{R_2}{R_1 + R_2};$$

as an additional voltage drop is created when the current $I_{CABLE}$ flows through the first resistor R1, the voltage $V_{FB}$ decreases, which makes the voltage $V_{EA}$ increases, and the output voltage $V_{OUT}$ of the power supply output stage module 3 increases as well.

Along with an increase of an output current $I_{OUT}$ (namely, the increase of the load), the control voltage $V_{EA}$ increases, and the current $I_{CABLE}$ increases gradually. For a larger current $I_{CABLE}$, the feedback voltage $V_{FB}$ decreases much more, and the output voltage $V_{OUT}$ increases much more than that without compensation. Through changing the flow direction of the compensation current at normal working stage, the compensation current in the interval of light load or even no load is very small, thereby reducing the power dissipation at light load or even no load.

Additionally, the compensation circuit detects the input voltage information of the converter and judges which range the input voltage falls within, based on which, the magnitude and the change slopes of the compensation current $I_{CABLE}$ are regulated, thereby compensating the differences of the modulation gain of the constant voltage control loop between conditions of high input voltages and conditions of low input voltages, so as to obtain better precision of constant output voltage.

Figure 5A:
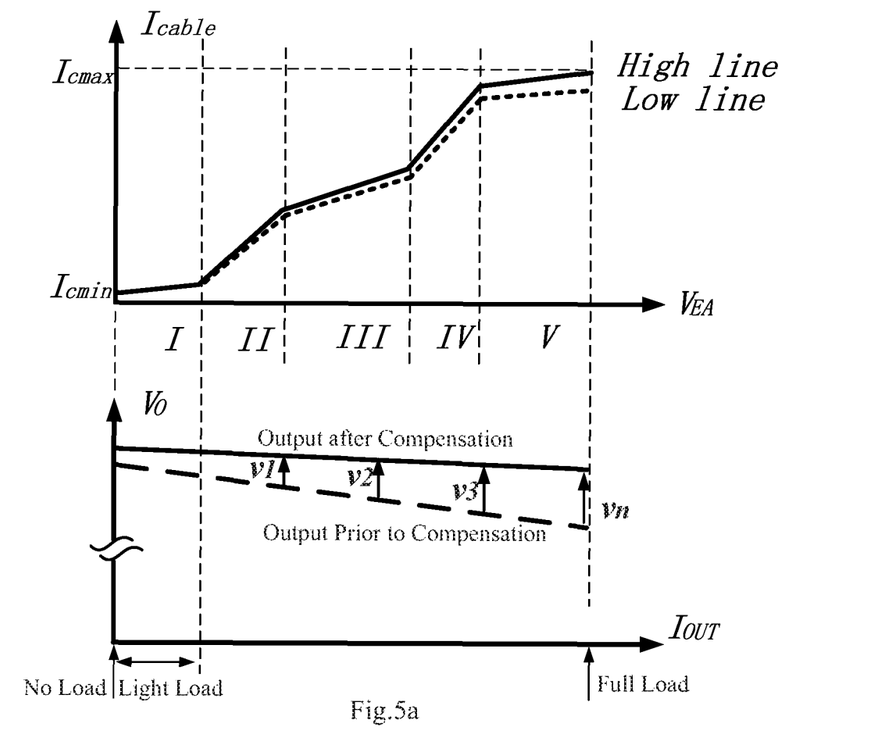
FIGS. 5(a) and 5(b) illustrate waveforms of the power supply converter with constant output voltage compensation according to the present disclosure.
Figure 5B:
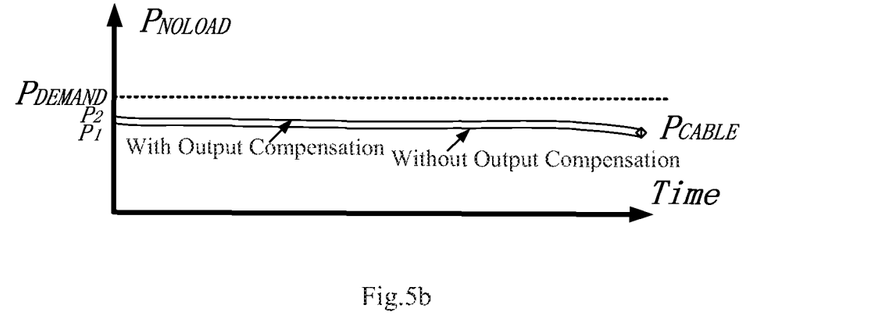

FIGS. 5(a) and 5(b) illustrate waveforms of the power supply converter with constant output voltage compensation of the present disclosure. As shown in FIG. 5a), when the load is applied from zero load to full load, the output voltage without compensation reduces gradually from a higher value to a lower value; while the compensation current $I_{CABLE}$ increases gradually as more load applied. When the constant voltage control loop adopts a combined modulation mode, the modulation gains of the constant voltage control loop are different in different load intervals; namely, a same amount of variation of voltage $V_{EA}$ corresponds to different load variations. Therefore, the change slopes of the current $I_{CABLE}$ are designed to be different in different intervals from Interval I to Interval V, so as to ensure the validity of compensation and better precision of constant output voltage. As a selected control policy of the CV loop, under the condition of lower input voltage (Low Line), the regulation gain of the CV loop differs from that under the condition of higher input voltage (High Line), and the variation profiles of the compensation current $I_{CABLE}$ are also different, so as to compensate for the differences between conditions of higher input voltages and conditions of lower input voltages. As shown in FIG. 5a), the output voltage with compensation remains consistent under the conditions of higher input voltages and conditions of lower input voltages, thereby improving the precision of constant voltage. As shown in FIG. 5b), as the compensation current $I_{CABLE}$ decreases along with the decrease of the load and can be ignored when no load is applied, the introduced power dissipation increase $P_{CABLE}$ is extremely small, which will not substantially increase the standby power dissipation.

Figure 6:
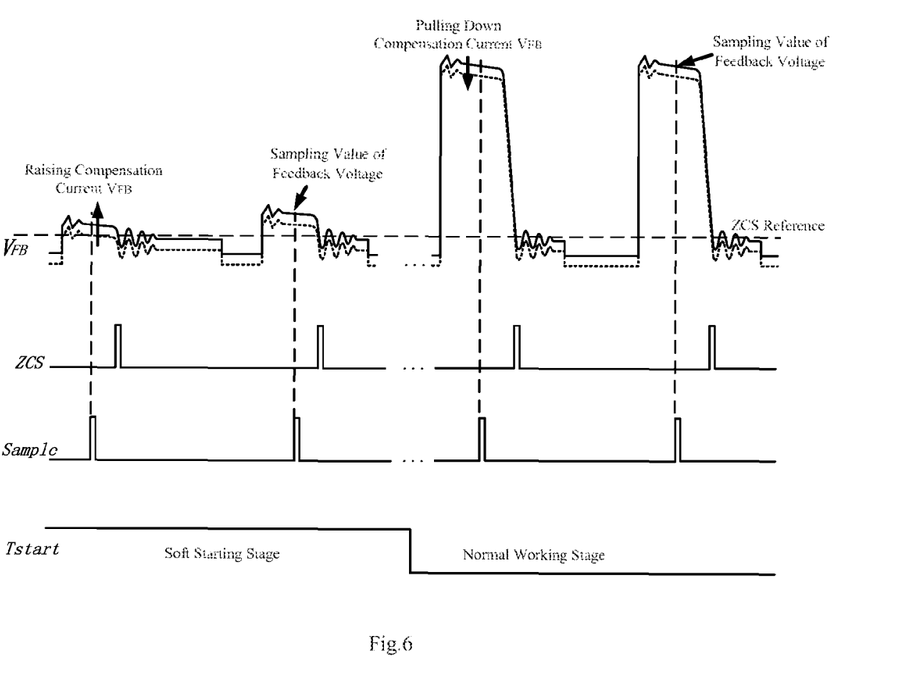
FIG. 6 is a schematic diagram illustrating another group of waveforms of the power supply converter with constant output voltage compensation according to the present disclosure.

FIG. 6 is a schematic diagram illustrating another group of waveforms of the power supply converter with constant output voltage compensation according to the present disclosure. The CV loop control module needs to sample the feedback voltage $V_{FB}$, and the sampling instants are strictly selected and are determined by detecting and dealing with certain events with respect to the curve of $V_{FB}$, for example, the sampling instant time is calculated on the basis of the time when a zero voltage arises at prior switching cycle. In designing the circuit, the reference for detecting the occurrence of the event, namely, the ZCS Reference value shown in the figure, is a value greater than zero. At the initial phase of the start-up, the $V_{FB}$ value is always lower than the ZCS Reference value, which will have influences on zero-cross detecting and on $V_{FB}$ sampling, which may lead to errors in the start-up. In order to avoid these influences, at the soft-starting stage of the power supply, a flow of compensation current flows out of the chip from the pin FB, thereby increasing the magnitude of the voltage $V_{FB}$ and ensuring normal zero-cross detecting and $V_{FB}$ sampling, so as to ensure that the power supply starts up normally and the output is established normally. After the soft-starting stage ends, a flow of compensation current flows into the chip from the pin FB, and thereby realizing normal compensation for constant output voltage.

Figure 7:
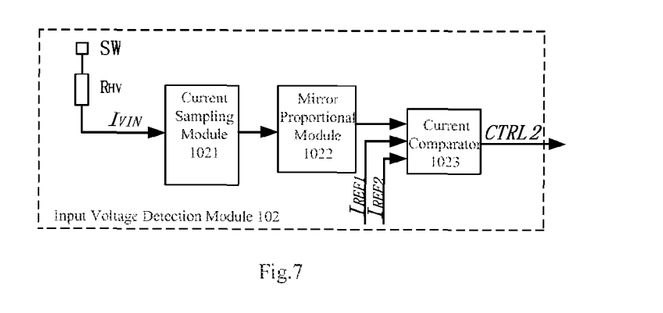
FIG. 7 is a structural block diagram illustrating the input voltage detection module in the compensation circuit according to the present disclosure.

As shown in FIG. 7, the input voltage detection module 102 includes a resistor $R_{HV}$, a current sampling module 1021, a mirror proportional module 1022, and a current comparator 1023. A first end of the resistor $R_{HV}$ is connected to the pin SW; a second end of the resistor $R_{HV}$ is connected to an input end of the current sampling module 1021; an output end of the current sampling module 1021 is connected to an input end of the mirror proportional module 1022; an output end of the mirror proportional module 1022 is connected to a first input end of the current comparator 1023; a second input end and a third input end of the current comparator 1023 are respectively connected to a first current reference terminal $I_{REF1}$ and a second current reference terminal $I_{REF2}$.

The input voltage detection module 102 detects the input voltage of the power supply converter, judges which range the input voltage falls within, and generates a control signal to regulate the compensation current $I_{CABLE}$ when the power supply converter works at normal stage.

The input voltage detection module 102 samples and processes the current flows into the input voltage detection module 102 from the pin SW to get information of an input voltage of the power supply converter, the input voltage is from an AC input terminal or a DC input terminal of the power supply converter.

Figure 8:
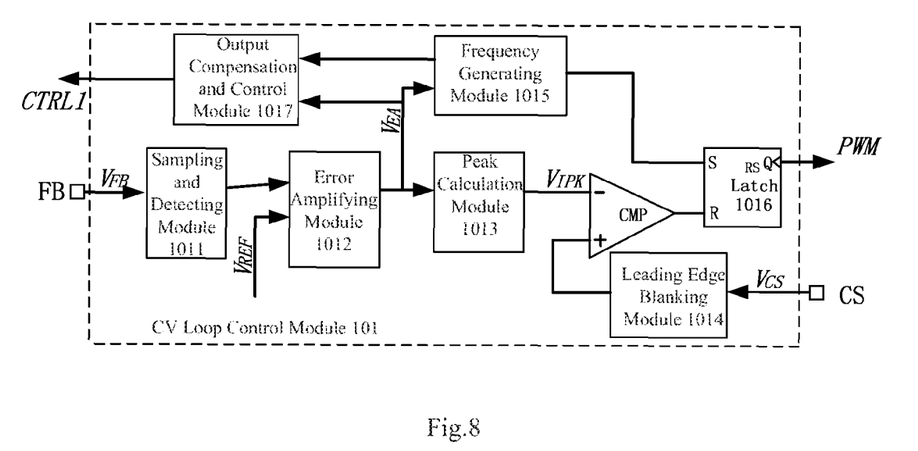
FIG. 8 is a structural block diagram illustrating the CV loop control module in the compensation circuit according to the present disclosure.

As shown in FIG. 8, the CV loop control module 101 includes a sampling and detecting module 1011, an error amplifying module 1012, a peak calculation module 1013, a comparator CMP, a leading edge blanking module 1014, a frequency generating module 1015, a RS latch 1016, and an output compensation and control module 1017. An input end of the sampling and detecting module 1011 is connected to the pin FB; an output end of the sampling and detecting module 1011 is connected to a first input end of the error amplifying module 1012; a second input end of the error amplifying module 1012 is connected to the reference terminal $V_{REF}$; a first output end of the error amplifying module 1012 is connected to an input end of the frequency generating module 1015 and is connected to a first input end of the output compensation and control module 1017; a second output end of the error amplifying module 1012 is connected to an input end of the peak calculation module 1013; a first output end of the frequency generating module 1015 is connected to a second input end of the output compensation and control module 1017; a second output end of the frequency generating module 1015 is connected to an input terminal S of the RS latch; an output end of the peak calculation module 1013 is connected to a negative input terminal of the comparator CMP; a positive input terminal of the comparator CMP is connected to an output end of the leading edge blanking module 1014; an output end of the comparator CMP is connected to an input terminal R of the RS latch 1016; an input end of the leading edge blanking module 1014 is connected to the pin CS. Based on the control voltage $V_{EA}$ generated by the error amplifying module 1012 and/or the switching frequency generated by the frequency generating module 1015, the output compensation and control module 1017 regulates the compensation current $I_{CABLE}$ at normal working stage. What's more, the current $I_{CABLE}$ is positively correlated with the control voltage $V_{EA}$ and/or the switching frequency.

The CV loop control module 101 detects the magnitude of the output load of the power supply converter and generates a control signal based on the magnitude of the output load, so as to regulate the compensation current $I_{CABLE}$ at normal working stage.

Based on the sampled $V_{FB}$ value and the reference value $V_{REF}$, the error amplifying module 1012 generates a control voltage $V_{EA}$, which represents the information of the output load, and regulates the switching frequency of the power switch and the peak of the primary-side current of the transformer based on the control voltage $V_{EA}$. Further, the magnitude of the input power is regulated. On the other hand, based on at least one of the control voltage $V_{EA}$ and the switching frequency, the output compensation and control module 1017 outputs a control signal CTRL1, so as to regulate the compensation current $I_{CABLE}$, and the current $I_{CABLE}$ is positively correlated with the control voltage $V_{EA}$ and/or the switching frequency.

The compensation circuit for constant output voltage of the present disclosure can not only meet the design requirements of low standby power dissipation for the power supply converter, but also increase the precision of constant output voltage.

It should be noted that, what described above are merely preferred embodiments of the present invention, and the present invention is not restricted to the preferred embodiments. It should be understood by those skilled in the art that the preferred embodiments above can be implemented, and that other equivalent modifications or improvement made without departing from the spirits of the present invention should all be included within the scope of the present invention.

What is claimed is:

1. A compensation circuit for constant output voltage, comprising a current source (S1), a first switch (T1), a controllable current source (S2), a second switch (T2), a logic NOT gate (G1), a CV loop control module (101), and an input voltage detection module (102); an input end of the current source (S1) is connected to a power supply signal terminal $V_{supply}$ in a power supply control chip; an output end of the current source (S1) is connected to a first end of the first switch (T1); a second end of the first switch (T1) is connected to a first input end of the CV loop control module (101), a first end of the second switch (T2), and a pin FB of the power supply control chip; a control end of the first switch (T1) is connected to an input end of the logic NOT gate (G1) and a signal terminal $T_{start}$; a second end of the second switch (T2) is connected to an input end of the controllable current source (S2); a control end of the second switch (T2) is connected to an output end of the logic NOT gate (G1); a first control end of the controllable current source (S2) is connected to a first output end of the CV loop control module (101); a second control end of the controllable current source (S2) is connected to an output end of the input voltage detection module (102); an output end of the controllable current source (S2) is connected to the power supply ground; a second input end of the CV loop control module (101) is connected to a pin CS of the power supply control chip; a second output end of the CV loop control module (101) is connected to an input end of the driving module (2); and an input end of the input voltage detection module (102) is connected to a pin SW of the power supply control chip.

2. The compensation circuit for constant output voltage according to claim 1, wherein, the pin SW is connected to a drain of a power transistor (M1); the pin FB is connected to a first end of a first resistor (R1) and a first end of a second resistor (R2); the pin CS is connected to a source of the power transistor (M1) and a first end of a resistor Rs; an output end of the driving module (2) is connected to a grid of the power transistor (M1); a second end of the first resistor (R1) is connected to a source $N^*V_{OUT}$ of a primary feedback side; a second end of the second resistor (R2) is connected to the power supply ground; and a second end of the resistor Rs is connected to the power supply ground.

3. The compensation circuit for constant output voltage according to claim 1, wherein, when a signal at the signal terminal $T_{start}$ is a high level, namely, at a soft-starting stage, a compensation current $I_{CABLE}$ supplied by the current source (S1) flows out of the chip from the pin FB and flows through a second resistor (R2); when the signal at the signal terminal $T_{start}$ is a low level, namely, at a normal working stage after a soft start-up, the compensation current $I_{CABLE}$ supplied by the controllable current source (S2) flows through a first resistor (R1) and flows into the chip from the pin FB.

4. The compensation circuit for constant output voltage according to claim 1, wherein, the input voltage detection module (102) comprises a resistor $R_{HV}$, a current sampling module (1021), a mirror proportional module (1022), and a current comparator (1023); a first end of the resistor $R_{HV}$ is connected to the pin SW; a second end of the resistor $R_{HV}$ is connected to an input end of the current sampling module (1021); an output end of the current sampling module (1021) is connected to an input end of the mirror proportional module (1022); an output end of the mirror proportional module (1022) is connected to a first input end of the current comparator (1023); a second input end and a third input end of the current comparator (1023) are respectively connected to a first current reference terminal $I_{REF1}$ and a second current reference terminal $I_{REF2}$.

5. The compensation circuit for constant output voltage according to claim 4, wherein, the input voltage detection module (102) is configured to detect an input voltage of a power supply converter, judge which range the input voltage falls within, and generate a control signal to regulate a compensation current $I_{CABLE}$ when the power supply converter works at normal stage.

6. The compensation circuit for constant output voltage according to claim 4, wherein, the input voltage detection module (102) is configured to sample and process a current flows into the input voltage detection module from the pin SW to get information of an input voltage of a power supply converter; and the input voltage is from an AC input end or a DC input end of the power supply converter.

7. The compensation circuit for constant output voltage according to claim 1, wherein, the input voltage detection module (102) is configured to detect an input voltage of a power supply converter, judge which range the input voltage falls within, and generate a control signal to regulate a compensation current $I_{CABLE}$ when the power supply converter works at normal stage.

8. The compensation circuit for constant output voltage according to claim 1, wherein, the input voltage detection module (102) is configured to sample and process a current flows into the input voltage detection module from the pin SW to get information of an input voltage of a power supply converter; and the input voltage is from an AC input end or a DC input end of the power supply converter.

9. The compensation circuit for constant output voltage according to claim 1, wherein, the CV loop control module (101) comprises a sampling and detecting module (1011), an error amplifying module (1012), a peak calculation module (1013), a comparator (CMP), a leading edge blanking module (1014), a frequency generating module (1015), a RS latch (1016), and an output compensation and control module (1017); an input end of the sampling and detecting module (1011) is connected to the pin FB; an output end of the sampling and detecting module (1011) is connected to a first input end of the error amplifying module (1012); a second input end of the error amplifying module (1012) is connected to a reference terminal $V_{REF}$; a first output end of the error amplifying module (1012) is connected to an input end of the frequency generating module (1015) and is connected to a first input end of the output compensation and control module (1017); a second output end of the error amplifying module (1012) is connected to an input end of the peak calculation module (1013); a first output end of the frequency generating module (1015) is connected to a second input end of the output compensation and control module (1017); a second output end of the frequency generating module (1015) is connected to an input terminal S of the RS latch (1016); an output end of the peak calculation module (1013) is connected to a negative input terminal of the comparator (CMP); a positive input terminal of the comparator (CMP) is connected to an output end of the leading edge blanking module (1014); an output end of the comparator (CMP) is connected to an input terminal R of the RS latch (1016); an input end of the leading edge blanking module (1014) is connected to the pin CS.

10. The compensation circuit for constant output voltage according to claim 9, wherein, the output compensation and control module (1017) is configured to regulate a compensation current $I_{CABLE}$ at normal working stage based on a control voltage $V_{EA}$ generated by the error amplifying module (1012) and/or a switching frequency generated by the frequency generating module (1015); and the current $I_{CABLE}$ is positively correlated with the control voltage $V_{EA}$ and/or the switching frequency.

11. The compensation circuit for constant output voltage according to claim 9, wherein, the CV loop control module (101) is configured to detect magnitude of an output load of a power supply converter, generate a control signal based on the magnitude of the output load, and regulate the compensation current $I_{CABLE}$ at normal working stage.

12. The compensation circuit for constant output voltage according to claim 9, wherein, at a soft-starting stage of a power supply converter, namely, when the signal at the signal terminal $T_{start}$ is a high level, the current source (S1) is on, while the controllable current source (S2) is off, a compensation current flows out of the pin FB and flows through a second resistor (R2) to increase a feedback voltage $V_{FB}$ and ensure normal sampling and detecting with respect to feedback voltage $V_{FB}$ at an initial phase of the soft-starting stage, thereby enabling a normal start-up; after the soft-starting stage ends, the signal $T_{start}$ is inverted to be a logic low level; the current source (S1) is off, while the controllable current source (S2) is on, the compensation current flows into the chip from the pin FB, thereby reducing power dissipation at light load or even no load; meanwhile, the CV loop control module (101) regulates the compensation current $I_{CABLE}$ based on a value of a control voltage $V_{EA}$, which represents an output load, and the compensation current is changed at different slopes in different load intervals so as to comply with the variations of the modulation gain of the constant voltage control loop; along with the increase of the load, namely, the increase of the output current $I_{OUT}$, the value of the control voltage $V_{EA}$ of the loop increases, and the compensation current $I_{CABLE}$ increases gradually; the feedback voltage $V_{FB}$ is represented as:

$$V_{FB} = N * V_{OUT} * \frac{R_2}{R_1 + R_2};$$

as an additional voltage drop is created when the current $I_{CABLE}$ flows through a first resistor, the feedback voltage $V_{FB}$ decreases, which makes the control voltage $V_{EA}$ increases, and the output voltage $V_{OUT}$ increases accordingly; along with an increase of an output current $I_{OUT}$, the control voltage $V_{EA}$ increases, and the current $I_{CABLE}$ increases gradually; for a larger current $I_{CABLE}$, the feedback voltage $V_{FB}$ decreases much more, and the output voltage $V_{OUT}$ increases much more than that without compensation; through changing a flow direction of the compensation current at normal working stage, the compensation current in an interval of light load or even no load is very small, thereby reducing power dissipation at light load or even no load.

13. The compensation circuit for constant output voltage according to claim 1, wherein, the CV loop control module (101) is configured to detect magnitude of an output load of a power supply converter, generate a control signal based on the magnitude of the output load, and regulate the compensation current $I_{CABLE}$ at normal working stage.

14. The compensation circuit for constant output voltage according to claim 1, wherein, at a soft-starting stage of a power supply converter, namely, when the signal at the signal terminal $T_{start}$ is a high level, the current source (S1) is on, while the controllable current source (S2) is off, a compensation current flows out of the pin FB and flows through a second resistor (R2) to increase a feedback voltage $V_{FB}$ and ensure normal sampling and detecting with respect to feedback voltage $V_{FB}$ at an initial phase of the soft-starting stage, thereby enabling a normal start-up; after the soft-starting stage ends, the signal $T_{start}$ is inverted to be a logic low level; the current source (S1) is off, while the controllable current source (S2) is on, the compensation current flows into the chip from the pin FB, thereby reducing power dissipation at light load or even no load; meanwhile, the CV loop control module (101) regulates the compensation current $I_{CABLE}$ based on a value of a control voltage $V_{EA}$, which represents an output load, and the compensation current is changed at different slopes in different load intervals so as to comply with the variations of the modulation gain of the constant voltage control loop; along with the increase of the load, namely, the increase of the output current $I_{OUT}$, the value of the control voltage $V_{EA}$ of the loop increases, and the compensation current $I_{CABLE}$ increases gradually; the feedback voltage $V_{FB}$ is represented as:

$$V_{FB} = N * V_{OUT} * \frac{R_2}{R_1 + R_2};$$

as an additional voltage drop is created when the current $I_{CABLE}$ flows through a first resistor, the feedback voltage $V_{FB}$ decreases, which makes the control voltage $V_{EA}$ increases, and the output voltage $V_{OUT}$ increases accordingly; along with an increase of an output current $I_{OUT}$, the control voltage $V_{EA}$ increases, and the current $I_{CABLE}$ increases gradually; for a larger current $I_{CABLE}$, the feedback voltage $V_{FB}$ decreases much more, and the output voltage $V_{OUT}$ increases much more than that without compensation; through changing a flow direction of the compensation current at normal working stage, the compensation current in an interval of light load or even no load is very small, thereby reducing power dissipation at light load or even no load.

* * * * *